United States Patent
Fields

(10) Patent No.: US 7,170,003 B2
(45) Date of Patent: Jan. 30, 2007

(54) CUT-IN BOX

(76) Inventor: Dan Fields, 111 N. Church St., Lodi, CA (US) 95241

(*) Notice: Subject to any disclaimer, the term of this patent is extended or adjusted under 35 U.S.C. 154(b) by 0 days.

(21) Appl. No.: 11/191,477

(22) Filed: Jul. 28, 2005

(65) Prior Publication Data

US 2006/0021778 A1    Feb. 2, 2006

Related U.S. Application Data

(60) Provisional application No. 60/592,255, filed on Jul. 29, 2004.

(51) Int. Cl.
*H01H 9/02* (2006.01)

(52) U.S. Cl. ............... 174/58; 174/57; 174/53; 174/481; 220/3.3; 248/906

(58) Field of Classification Search ......... 174/58, 174/53, 57, 50, 48, 49, 17 R, 480, 481; 220/3.2, 220/3.3, 3.4, 3.5, 3.6, 3.7, 3.8, 4.02; 248/906, 248/343; 439/535; D13/152
See application file for complete search history.

(56) References Cited

U.S. PATENT DOCUMENTS

| | | | | |
|---|---|---|---|---|
| 2,769,562 A | * | 11/1956 | Rudolph | 220/3.4 |
| 2,842,281 A | * | 7/1958 | Chisholm | 220/3.6 |
| 3,139,480 A | * | 6/1964 | Desloge | 174/65 R |
| 3,633,782 A | * | 1/1972 | Bellinger | 220/3.5 |
| 4,057,164 A | * | 11/1977 | Maier | 220/3.6 |
| 4,226,393 A | * | 10/1980 | Rardin et al. | 174/58 |
| 4,332,330 A | * | 6/1982 | Lockwood | 220/3.5 |
| 4,609,119 A | * | 9/1986 | Richter, Sr. | 220/3.5 |
| 4,898,357 A | * | 2/1990 | Jorgensen et al. | 174/48 |
| 5,478,032 A | * | 12/1995 | Miller | 174/48 |
| 6,170,685 B1 | * | 1/2001 | Currier | 220/3.3 |

FOREIGN PATENT DOCUMENTS

GB    2064871 A  *  6/1981

* cited by examiner

Primary Examiner—Angel R. Estrada
(74) Attorney, Agent, or Firm—Richard D. Clarke

(57) ABSTRACT

The present invention relates to a cut-in box that is stabilized without the support of a neighboring stud. Tabs extend from some or all of the sidewalls of the box and retract to a position flush with the sidewalls while the box is inserted into an appropriate wallboard opening. Because the tabs are spaced from the front face of the box at a distance substantially equal to the thickness of the wallboard, the tabs spring back to their original position when the front face of the box reaches a position that is essentially flush with the wallboard. A threaded rod projects from the rear wall of the cut-in box and is extensible to reach the sheet of wallboard opposite to the rear face of the cut-in box. The combined action of the tabs and of the threaded rod holds the cut-in box securely in place within the wallboard opening.

15 Claims, 3 Drawing Sheets

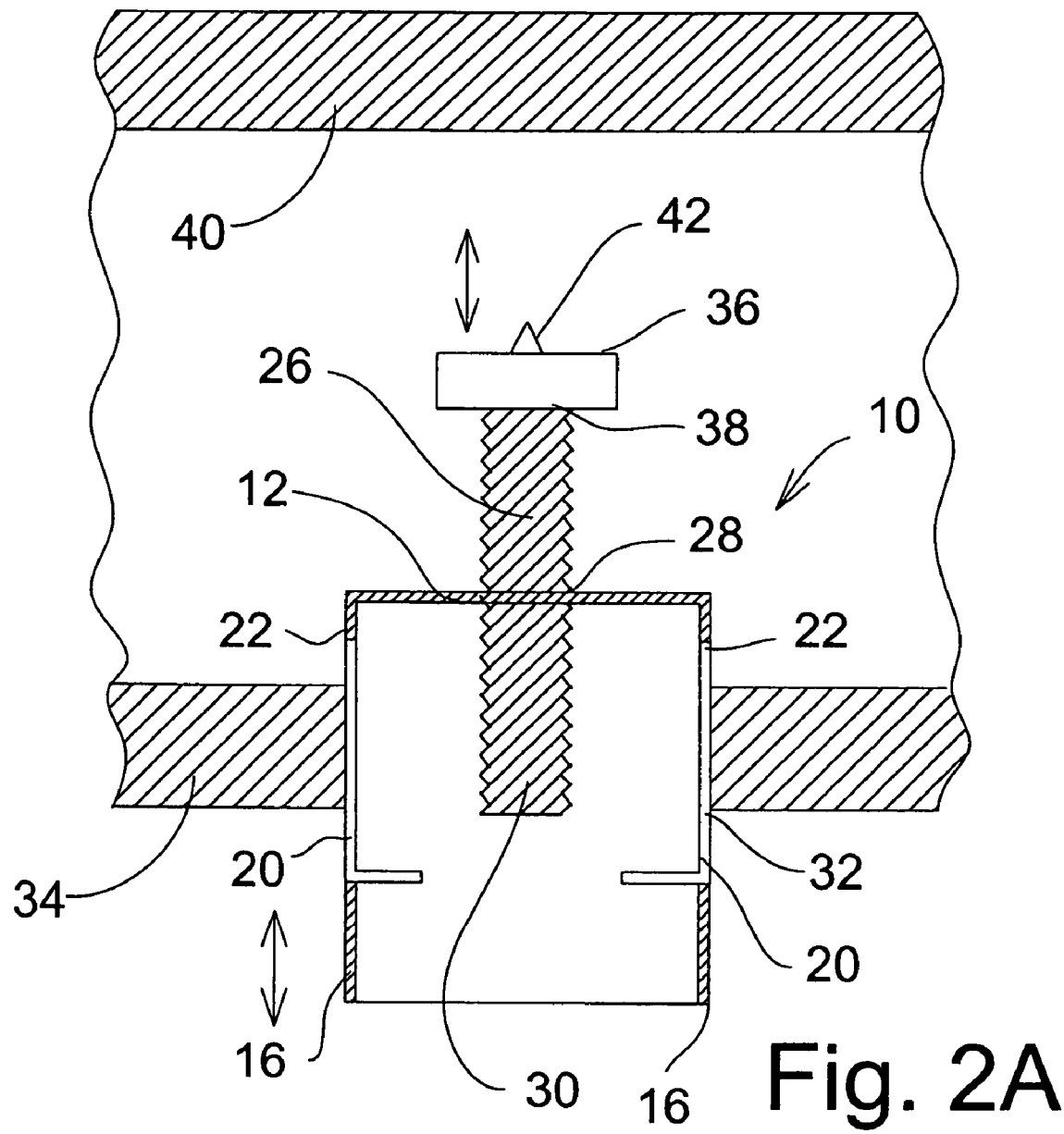

CUT-IN BOX

This application claims the benefit of U.S. Provisional patent application Ser. No. 60/592,255 filed on Jul. 29, 2004.

FIELD OF THE INVENTION

The present invention relates to a cut-in box, and more particularly to a cut-in box that can be employed in the construction industry for electrical applications, such as the wall mounting of electrical lighting switches and of electrical power outlets.

DESCRIPTION OF RELATED ART

Framing walls with studs and wallboards is a common construction technique. Studs are columnar elements that provide strength and rigidity to the structure, while wallboards are rigid sheets that are affixed to both sides of a row of studs, providing a wall with a functional and aesthetically pleasing finish.

Building codes require that electrical connections, such as wire splices, light switches, and electrical outlets, be encased in electrical boxes. Such boxes are generally made of metal or plastic and are attached to the studs prior to wallboard application, enabling the electricians to operate without the constraints of the applied wallboards.

In many instances, however, electrical boxes must be installed after application of wallboards and without the supports of studs. This occurs, for example, in locations where it is impossible or inconvenient to connect a box to a stud. Therefore, there is a need for a "cut-in" electrical box, or an electrical box that can be installed securely without affixing that box to a stud. A similar need exists also for non-electrical applications.

A number of inventions have been disclosed in the prior art that relate to cut-in boxes. More specifically, U.S. Pat. No. 4,332,330 to Lockwood discloses an electrical cut-in box that is stabilized into a wallboard opening by means of lips extending from the front face of the box, and also by a plurality of folding cleats that extend when screws, threadably engaged with the cleats, are turned. This invention, however, does not provide for a certain engagement of the box with the wallboard, because the thickness of the wallboard may fluctuate while the cleats are at a constant distance from the front face of the box. Further, practice of this invention involves an assembly with a multiplicity of components.

U.S. Pat. No. 5,478,032 to Miller teaches instead a cut-in box that includes a frame surrounding the rear side of a wallboard opening, brackets fastening the frame to the periphery of the wallboard opening, and a box connected to the frame. This invention requires a multiplicity of components and appears rather laborious to install.

U.S. Pat. No. 6,170,685 to Currier discloses an electrical box kit, which is foldable and which is inserted into a wallboard opening and then held in position by the combined action of flanges and rotating clips. The flanges extend from the front face of the box, while the rotating clips extend from the side faces of the box and then move forward, compressing against the wallboard. Multiple components are required for the manufacture of a box according to this invention, and, further, the box itself requires assembly on site.

U.S. Pat. No. 6,323,424 to He instead teaches a bracket attached to a stud and secured by a wall spacer, the bracket contains an aperture and countersunk recesses. An electrical box is then inserted into the aperture and is fastened to the bracket at the recesses. Practice of this invention requires access to a stud, multiple components, and a laborious installation.

U.S. Pat. No. 6,484,980 to Medlin et al. discloses a bracket that can be extended between studs to support an electrical box. The practice of this invention, however, requires multiple components, the labor expense of installing the bracket, and access to two studs.

U.S. Pat. No. 4,898,357 to Jorgensen et al. teaches instead a support member that is inserted in the rear of an electric box and that can be adjusted lengthwise to reach the sheet of wallboard opposite the rear of the box. The length of the support member is adjusted by snapping off predetermined portions of the support member. While this invention relates to an electric box that is attached to a stud, it provides a system for holding an electric box in position. However, practice of this invention requires the positioning of the support member in a point in the rear of the box that is as distant from the stud as possible, and further, by snapping off predetermined portions of the support member, the electrician is unable to fine-tune to degree of extension of the support member.

From the foregoing, there is an apparent need for a cut-in box that can be installed without the support of neighboring studs. There is a further need for a cut in box that is inexpensive to manufacture and install, and that can be installed quickly and without any specific construction skills.

While the foregoing discussion has been limited to cut-in electrical boxes, the same types of requirements apply to cut-in boxes for non-electrical applications.

SUMMARY OF THE INVENTION

A primary advantage of the present invention is to provide a cut-in box that can be installed without the support of neighboring studs.

Another advantage of the present invention is to provide a cut-in box that is inexpensive to manufacture and to install.

A further advantage of the present invention is to provide a cut-in box that can be installed rapidly and without any specific construction skills.

Yet another advantage of the present invention is to provide a cut-in box that can be used for a variety of applications, both electrical and non-electrical.

These advantages, together with other advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated the preferred embodiments of the invention.

The present invention relates to a cut-in box that is stabilized without the support of a neighboring stud. Tabs extend from some or all of the sidewalls of the box and retract to a position flush with the sidewalls while the box is inserted into an appropriate wallboard opening. Because the tabs are spaced from the front face of the box at a distance substantially equal to the thickness of the wallboard, the tabs spring back to their original position when the front face of the box reaches a position that is essentially flush with the wallboard. A threaded rod projects from the rear wall of the cut-in box and is extensible to reach the sheet of wallboard opposite to the rear face of the cut-in box. The combined action of the tabs and of the threaded rod holds the cut-in box securely in place within the wallboard opening.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

BRIEF DESCRIPTION OF THE DRAWINGS

The accompanying drawings, which are incorporated in and form a part of this specification, illustrate embodiments of the invention and together with the description, serve to explain the principles of this invention, wherein:

FIG. 2A illustrates a cross-sectional top view of the preferred embodiment of the present invention during positioning in an appropriate wallboard opening.

For a fuller understanding of the nature and advantages of the invention, reference should be had to the following detailed description taken in conjunction with the accompanying drawings which are incorporated into and form a part of this specification, illustrate embodiments of the invention, and together with the description, serve to explain the principles of this invention.

DETAILED DESCRIPTION OF THE PREFERRED EMBODIMENTS

Figure 1:
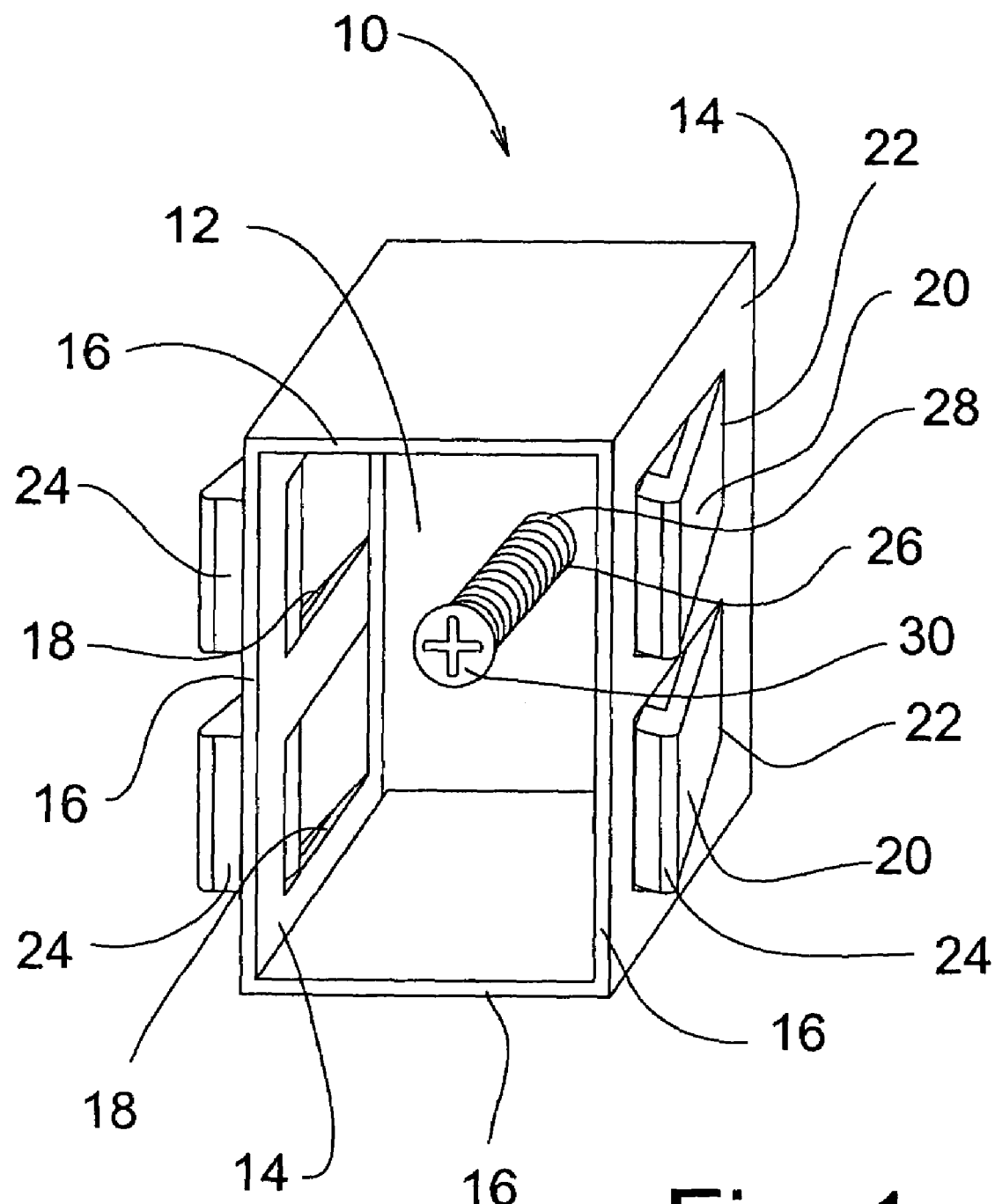
FIG. 1 illustrates a perspective view of the preferred embodiment of the present invention, constructed in accordance with the present invention.

Referring now to the drawings, there is illustrated in FIG. 1 the preferred embodiment of cut-in box 10, constructed in accordance with the present invention. Cut-in box 10 includes rear wall 12, one or more side walls 14, and an open front face delimited by edges 16. Side walls 14 each contain one or more slots 18, where through one or more retracting tabs 20 extend from each of the side walls 14. In other embodiments, tabs 20 may extend from two non-parallel side walls 14, or from more than two side walls 14. For example, in a box with four side walls 14, tabs 20 may extend from each one of side walls 14. Cut-in box 10 may be manufactured from a variety of materials. In the preferred embodiment, cut-in box 10 is manufactured from PVC plastic. In other embodiments, cut-in box 10 may be manufactured from other plastic materials, such as polypropylene, or from metal.

Tabs 20 are connected to side walls 14 by living hinges 22. Living hinges 22 are preferably comprised of plastic material located at the connection of tabs 20 with side walls 14, which deforms and contracts allowing tabs 20 to retract and return to their original position. Tabs 20 can retract into slots 18 upon insertion of cut-in box 10 into a wall opening (see FIG. 2A). Upon completion of the insertion of cut-in box 10 into the wall opening, tabs 20 can expand outside of slots 18 back to their original position, thereby providing a support means for cut-in box 10 (see FIG. 2B). Because of living hinges 22, no external forces, such as those created by the use of a tool, are needed to bend or pry tabs 20 back into their original position. In other embodiments, living hinges 22 may be replaced by a combination of hinges and springs that enable tabs 20 to rotate and successively return to their original positions, or by a combination of springs and living hinges. Tab ends 24 are located on tabs 20 opposite living hinges 22, and are spaced from edges 16 by a distance substantially equal to the thickness of standard wallboard, which is generally ½".

A threaded rod 26 is screwed in a threaded opening 28 of rear wall 12. The proximal end 30 of threaded rod 26, facing the open face of cut-in box 10 delineated by edges 16, has a pattern enabling a user to turn and screw threaded rod 26 into threaded opening 28 to either extend or retract threaded rod 26 from rear wall 12. In the preferred embodiment, proximal end 30 is patterned for use with a Phillips screwdriver. In other embodiments, proximal end 30 may be slotted, shaped for use with an Allen wrench, or may include one of a variety of different designs as apparent to a person skilled in the art.

Figure 2B:
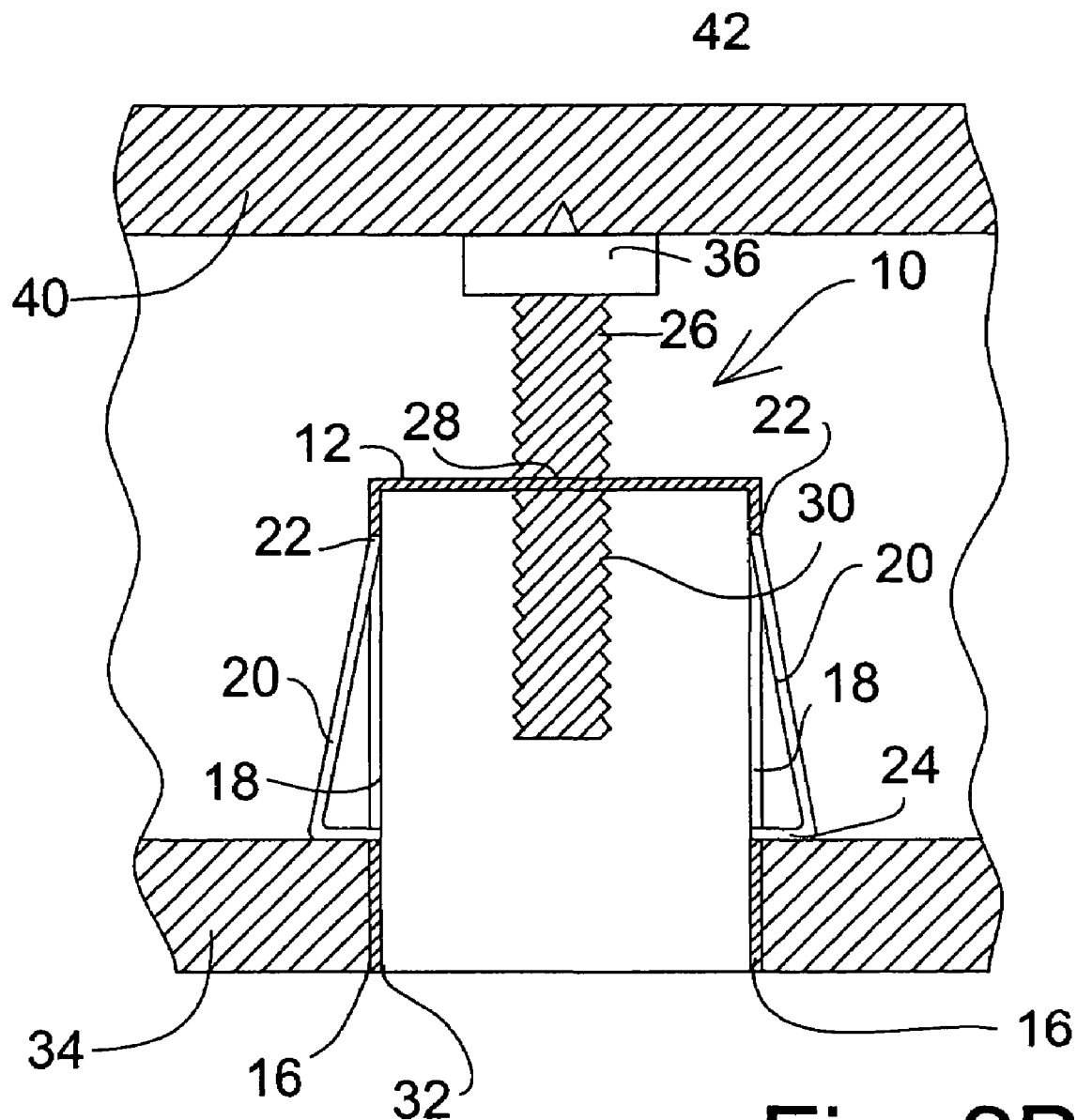
FIG. 2B illustrates a cross-sectional top view of the preferred embodiment of the present invention after positioning in an appropriate wallboard opening.

As illustrated in FIG. 2A, there is seen a cross-sectional top view of cut-in box 10 during positioning within an opening 32 of wallboard 34. In this position, tabs 20 are compressed into slots 18 (see FIG. 2B), such that they are substantially flush with side walls 14, enabling a smooth insertion of cut-in box 10 into opening 32.

A flange 36 extends from distal end 38 of threaded rod 26, facing a second wallboard 32. Flange 36 provides threaded rod 26 with a larger contact surface with rear wallboard 40. A piercing tip 42 extends from flange 36 to penetrate wallboard 40, providing greater stability to cut-in box 10. In other embodiments, piercing tip 42 may encompass different shapes and sizes, have more than one engaging tip, or are excluded.

As illustrated in FIG. 2B, there is seen a cross-sectional top view of cut-in box 10 after positioning within opening 32. In this position, edges 16 are flush with the outer surface of wallboard 34, and tabs 20 are no longer compressed by wallboard 34, allowing tabs 20 to spring back into their original position. Additionally, threaded rod 26 extends from rear wall 12 to wallboard 40 such that piercing tip 42 is positioned within wallboard 40 and flange 36 is firmly pressed against wallboard 40, providing increased stability and support for cut-in box 10.

The cut-in box shown in the drawings and described in detail herein disclose arrangements of elements of particular construction and configuration for illustrating preferred embodiments of structure and method of operation of the present invention. It is to be understood however, that elements of different construction and configuration and other arrangements thereof, other than those illustrated and described may be employed for providing a cut-in box in accordance with the spirit of this invention, and such changes, alternations and modifications as would occur to those skilled in the art are considered to be within the scope of this invention as broadly defined in the claims.

Further, the purpose of the foregoing abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting, as to the scope of the invention in any way.

I claim:
1. A cut-in box comprising:
 a) a housing, said housing containing a front surface, a rear surface, and at least two side surfaces, wherein said rear surface contains a threaded opening for the pur- pose of receiving a rod and said at least two side surfaces each contain one or more slots;

b) at least one tab positioned within said one or more slots, said at least one tab coupled to said at least two side surfaces to enable said at least one tab to retract into said one or more slots upon insertion of the cut-in box into a wall opening and expand outside of said one or more slots without the need of external forces upon completion of the insertion of the cut-in box into the wall opening;

c) a threaded rod disposed through said threaded opening of said rear surface, one end of said threaded rod containing a flange for the purpose of engaging a wallboard to provide support for the cut-in box; and d) wherein a distal end of said flange contains a piercing tip for the purpose of penetrating the outer surface of said wallboard, thereby providing more stability and support for the cut-in box when installed;

whereby a user inserts the cut-in box into an appropriate opening in a first wallboard until said front surface is aligned flush with the outer surface of the first wallboard, then translates said rod through said opening until said flange engages a second wallboard.

2. The cut-in box according to claim 1, wherein said piercing tip at the distal end of said flange includes a sharp metallic piercing tip.

3. The cut-in box according to claim 2, wherein said piercing tip contains one or more sharp metallic prongs for the purpose of engaging a wallboard.

4. The cut-in box according to claim 1, wherein said at least one tab is coupled to said at least two side surfaces by a living hinge.

5. The cut-in box according to claim 4, wherein said living hinge is comprised of an expandable thermoplastic material.

6. The cut-in box according to claim 4, wherein said threaded rod is comprised of an expandable thermoplastic material.

7. The cut-in box according to claim 1, wherein said at least one tab is coupled to said at least two side surfaces by a combination of springs and hinges.

8. The cut-in box according to claim 1, wherein said at least two side surfaces each contain two slots.

9. The cut-in box according to claim 1, wherein said housing is comprised of a plastic material.

10. The cut-in box according to claim 1, wherein a distal end of said at least one tab is positioned away from said front surface at a distance substantially equal to the thickness of the wallboard.

11. The cut-in box according to claim 10, wherein the distance is about ½ of an inch.

12. The cut-in box according to claim 1, wherein the other end of said rod contains a patterned means for the purpose of enabling the insertion or retraction of said rod through said opening.

13. The cut-in box according to claim 12, wherein said patterned means is an indentation shaped to engage a phillips head screwdriver.

14. The cut-in box according to claim 12, wherein said patterned means is an indentation shaped to engage a flat head screwdriver.

15. A method of making a cut-in box comprising the steps of:

a) providing a housing, said housing containing a front surface, a rear surface, and at least two side surfaces, wherein said rear surface contains a threaded opening for the purpose of receiving a threaded rod and said at least two side surfaces each contain one or more slots;

b) providing at least one tab for positioning within said one or more slots and coupled to said at least two side surfaces to enable said at least one tab to retract into said one or more slots upon insertion of the cut-in box into a wall opening and expand outside of said one or more slots without the need of external forces upon completion of the insertion of the cut-in box into the wall opening;

c) positioning said at least one tab within said one or more slots, whereby said at least one tab is coupled to said at least two side surfaces to enable said at least one tab to retract into said one or more slots upon insertion of the cut-in box into a wall opening and expand outside of said one or more slots without the need of external forces upon completion of the insertion of the cut-in box into the wall opening;

d) providing a threaded rod for positioning through said threaded opening of said rear surface, one end of said threaded rod containing a flange for the purpose of engaging a wallboard to provide support for the cut-in box;

e) providing said threaded rod wherein a distal end of said flange contains a piercing tip for the purpose of penetrating the outer surface of said wallboard, thereby providing more stability and support for the cut-in box when installed; and f) positioning said rod through said opening of said rear surface, whereby said rod can be inserted or retracted through said opening of said rear surface.

* * * * *